United States Patent [19]

Kustanovich

[11] Patent Number: 4,659,090

[45] Date of Patent: Apr. 21, 1987

[54] ELECTRICAL DEVICE FOR INDICATING THE FORCE AND/OR LOCATION OF TARGET IMPACTS OR OTHER FORCES

[75] Inventor: Yosef Kustanovich, Rehovot, Israel

[73] Assignee: Cybertronics Ltd., Rishon Lezion, Israel

[21] Appl. No.: 767,914

[22] Filed: Aug. 21, 1985

[30] Foreign Application Priority Data

Aug. 21, 1984 [IL] Israel ........................................ 72737

[51] Int. Cl.$^4$ .............................................. F41J 5/04
[52] U.S. Cl. .................................. 273/376; 273/26 A; 273/185 R
[58] Field of Search ............................ 273/371–376, 273/181 R, 35 B, 183 R, 184 R, 185 R, 185 A, 185 B, 185 C, 185 D, 317, 410, 377, 26 A

[56] References Cited

U.S. PATENT DOCUMENTS

| | | | |
|---|---|---|---|
| 3,275,321 | 9/1966 | Forest | 273/373 |
| 3,499,651 | 3/1970 | Hubbard | 273/373 |
| 3,690,661 | 9/1972 | Schärz et al. | 273/374 |

*Primary Examiner*—Richard C. Pinkham
*Assistant Examiner*—Mary Ann Stoll Lastova
*Attorney, Agent, or Firm*—Benjamin J. Barish

[57] ABSTRACT

An electrical device capable of indicating the force and/or location of an impact or other applied force, such as a weight, comprises three or more layers including a continuously-conductive electrode layer, a selectively-conductive electrode layer, and a pressure-sensitive impedance layer between the two electrode layers and forming electrode impedances between them, such that when the force is applied, the electrical impedances are changed in value to provide an indication of the magnitude and/or location of the force.

18 Claims, 2 Drawing Figures

ELECTRICAL DEVICE FOR INDICATING THE FORCE AND/OR LOCATION OF TARGET IMPACTS OR OTHER FORCES

BACKGROUND OF THE INVENTION

The present invention relates to electrical devices capable of indicating the magnitude and/or location of impacts or other applied forces, such as weights. The invention is particularly useful as a target and is therefore described below with respect to this application.

Many types of electrical targets have been devised for providing an indication of the location of impact on the target. There are many applications, however, wherein it would also be desirable to provide an electrical indication of the force of impact as well as the location of impact. An object of the invention is to provide such a device.

SUMMARY OF THE INVENTION

According to a broad aspect of the present invention, there is provided an electrical device capable of indicating the magnitude and/or location of an impact or other applied force comprising at least three layers including: a continuously-conductive electrode layer of electrically-conductive material; a selectively-conductive electrode layer having a central area of electrically-conductive material and at least one circumscribing area of electrically-conductive material circumscribing the central area and separated therefrom by a gap; and a pressure-sensitive impedance layer between each two electrode layers and forming a first electrical impedance between the continuously-conductive electrode layer and the central area of the selectively-conductive electrode layer, and a second electrical impedance between the continuously-conductive electrode layer and the circumscribing area of the selectively-conductive layer; the pressure-sensitive impedance layer being compressively-deformable upon application of the force such as to change the values of the first and second electrical impedances, thereby providing an indication of the magnitude and/or location of the force.

The invention is particularly advantageous when the pressure-sensitive impedance layer is a dielectric layer which forms first and second capacitors between the continuously-conductive electrode layer and the selectively-conductive electrode layer, the capacitances of which are changed by the impact of the object. The invention, however, could also be implemented in an electrical device wherein the intermediate layer forms first and second resistors with the two electrode layers, the resistances of which resistors are changed by the impact of the object.

For purposes of example, the invention is described below with respect to a target having four target areas and a total of eleven layers, including three continuously-conductive electrode layers, three selectively-conductive electrode layers, and five dielectric layers.

According to a further aspect of the invention, there is also provided a target display system, including a target constructed as described above, together with electrical measuring means and display means for displaying the changes in electrical impedances to provide an indication of the total force and location of impact of the object on the target.

Examples of applications of the invention include target devices for various sports, such as a pitcher's practicing target in baseball for indicating accuracy and speed of the thrown ball, and a golf practicing target for indicating the direction and distance of the hit ball. The invention could also be advantageously applied in other applications for indicating the magnitude of other forces, e.g., weights, and/or their locations.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
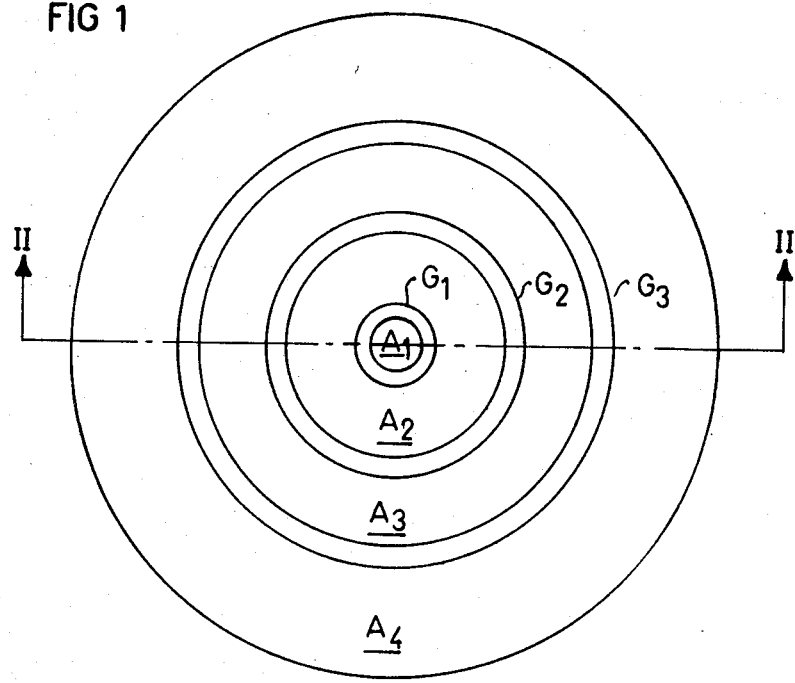
FIG. 1 illustrates a target constructed in accordance with one form of the invention.
Figure 2:
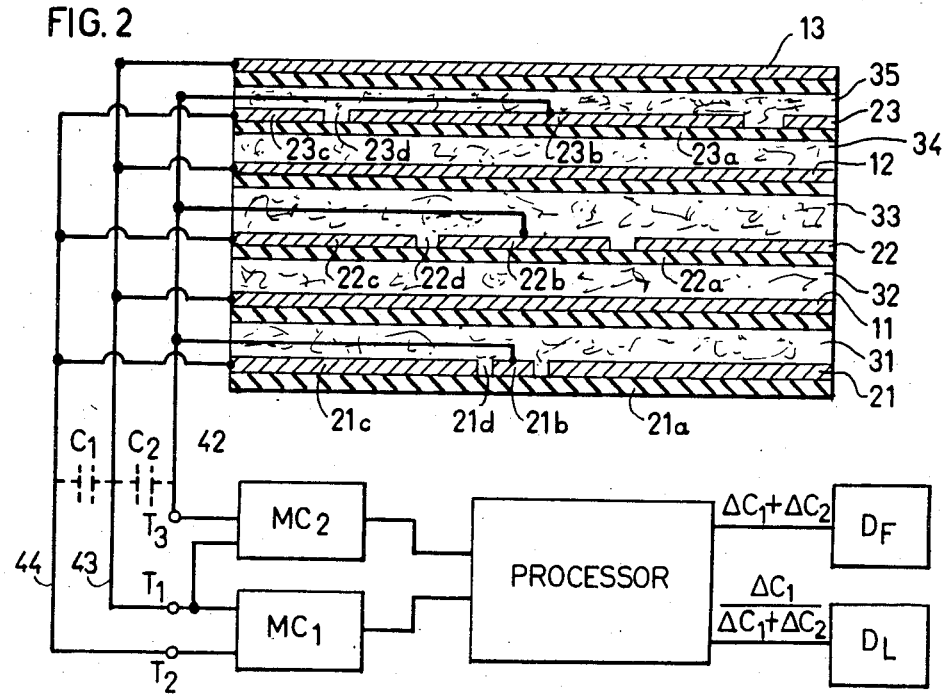
FIG. 2 illustrates a sectional view of the target of FIG. 1, along lines II—II, together with the electrical connections from the various layers of the target to the electrical system for providing a measurement and display of the force and location of the object impact on the target.

The electrical target illustrated in FIGS. 1 and 2 of the drawings is one wherein the target surface exposed to the viewer is divided into four target areas, namely a central area $A_1$ representing a "bulls-eye"; and three annular areas $A_2$, $A_3$ and $A_4$ of increasing diameter and all circumscribing the bulls-eye central area $A_1$. As shown in FIG. 1, each annular area $A_i$-$A_y$ is separated from the next one by an annular gap $G_1$-$G_3$, respectively.

The electrical target illustrated in FIG. 1 is constructed of eleven layers as more particularly illustrated in FIG. 2. These eleven layers consist of three continuously-conductive electrode layers 11, 12, 13; three selectively-conductive electrode layers 21, 22, 23; and five dielectric layers 31, 32, 33, 34 and 35. The three continuously-conductive electrode layers 11–13 alternate with the three selectively-conductive electrode layers 21–23; and the five dielectric layers 31–35 alternate with all the electrode layers 11–13 and 21–23, respectively.

Each of the three continuously-conductive electrode layers may be constituted of a continuous metal film, such as copper or aluminum, so as to be continuously conductive for the complete respective layer. Preferably, they each include a plastic film serving as a substrate on which is bonded the continuous metal film of the respective layer.

Each of the the three selectively-conductive electrode layers includes a plastic or other insulating film having two conductive areas formed thereon, such as by metal-spraying or printed-circuit etching techniques. Thus, selectively-conductive electrode layer 21 includes an insulating film 21a on which is deposited a central electrically-conductive area 21b and an annular electrically-conductive area 21c circumscribing and separated from area 21b by an annular gap 21d.

The second selectively-conductive electrode layer 22 also includes an insulating substrate 22a carrying a central electrically-conductive area 22b circumscribed by an annular electrically-conductive area 22c and separated from area 22b by an annular gap 22d; and similarly the third selectively-conductive electrode layer 23 includes an insulating substrate 23a carrying a central electrically-conductive area 23b circumscribed by electrically-conductive area 23c and separated therefrom by gap 23d. It will also be seen from FIG. 2 that the central electrically-conductive area 22b of electrode layer 22 is of larger diameter than electrically-conductive area 21b of electrode layer 21; and that electrically-conductive area 23b of electrode layer 23 is of larger diameter than electrically-conductive area 22b of electrode layer 22.

Annular gaps 21d, 22d and 23d coincide with gaps $G_1$, $G_2$ and $G_3$, respectively in FIG. 1. The latter gaps $G_1$–$G_3$ may be painted on either face, for example the insulating substrate face 21a, of the target so as to coincide with the above-described annular gap 21d, 22d and 23d in the electrode layers 21, 22 and 23.

The dielectric layers 31–35 interposed between adjacent electrode layers 11–13 and 21–23 are of compressively-deformable material which, upon impact by an object, compress under the force of the impact and thereby change the electrical impedance between the respective electrode layers. Many forms of compressively-deformable dielectric materials are known and may be used, for example sponge rubber. It is also contemplated that instead of using dielectric material which changes the capacitance between electrodes upon compression, there may also be used resistive material having a high electical resistance which changes in response to pressure, the change in electrical resistance produced by the impact also thereby providing an indication of the impact force.

The three continuously-conductive electrode layers 11–13 are all connected to a common lead 43 leading to a first terminal $T_1$; the annular areas of the three selectively-conductive electrode layers 21–23 are connected to another common lead 44 leading to a second terminal $T_2$; and the central areas of the three continuously-conductive electrode layers 11–13 are connected to a common third lead 42 leading to a third terminal $T_3$. The capacitance between terminals $T_1$ and $T_2$ is indicated by the broken-line capacitor $C_1$ which capacitance is measured by a measuring circuit $M_{C1}$; and the capacitance between terminals $T_1$ and $T_3$ is indicated by the broken line capacitor $C_2$, which capacitance is measured by a measuring circuit $M_{C2}$.

A processor processes the outputs of the above two measuring circuits, and produces a first output representing the sum of the capacitance changes produced by the impact of the object on the target ($C_1 + C_2$), which output is fed to a first display $D_F$; and a second output representing the change in capacitance $C_1$ divided by the sum of the capacitance changes of both $C_1$ and $C_2$, i.e., ($C_1/(C_1+C_2)$), which output is fed to a second display $D_L$. Display $D_F$ provides a measurement of the force of the object impact on the target, and display $D_L$ provides a measurement of the location of the object impact on the target.

The electrical target illustrated in the drawings operates as follows:

Assuming that an object, such as a dart, baseball or golf ball, is hurled against the target, the display $D_F$ will indicate the force of impact of the object on the target, and the display $D_L$ will indicate the location of the impact.

Thus wherever the object impacts the target, it will cause a compression of the portions of the dielectric layers 31–34 along the line of impact. The compression of these layers will change one or both capacitances $C_1$, $C_2$, depending on the location of the impact. The sum of the changes in capacitances $C_1$ and $C_2$ depends only on the force of impact of the object, and not on the impact location, and therefore display $D_F$, which merely displays this sum of the changes, provides an indication of the total impact force.

However, the change in capacitances of the $C_1$, $C_2$, relative to each the other, will depend on the location of the object impact on the target. Thus, if the impact is within the "bulls-eye" central area $A_1$, it will be seen that the impact will cause a maximum change in capacitance $C_1$ with a minimum change in capacitance $C_2$. Accordingly, display $D_L$ will display the maximum reading, indicating a "bulls-eye".

On the other hand, if the object impacts the target within the annular area $A_2$ of FIG. 1, the change in capacitance $C_1$ will be reduced; in addition, there will be an increase in capacitance $C_2$. Thus, the output from processor $P_R$ to display $D_L$ will represent a lower value than the output when the impact was in the "bulls-eye" center $A_1$.

If the impact is within the annular target area $A_3$ of FIG. 1, it will be seen that the change in capacitance $C_1$ will be even further reduced, whereas the change in capacitance $C_2$ will be further increased so that the output of display $D_L$ will further decrease; and if the impact is within the annular region $A_4$ in FIG. 1, the change in capacitance $C_1$ will be further reduced to its maximum value, whereas the change in capacitance $C_2$ will be increased to its maximum value, so that the output displayed by display $D_L$ will be a minimum value.

It will thus be seen that the illustrated device provides an indication of both the force of object impact on the target, and also an indication of the location of the impact. The force of impact may be converted to speed, as for example when the target is used for practicing baseball pitching or dart throwing, or may be converted to a distance, such as when the target is used for practice-hitting golf balls. It will also be appreciated that the location of the object's impact can be converted to accuracy, for example in baseball practice or dart-throwing as well as direction, for example in golf-ball hitting practice.

Whereas the described embodiment shows four target areas $A_1$–$A_4$, a larger number or a smaller number of target areas may be provided by merely including the appropriate number of continuously-conductive electrode layers and selectively-conductive electrode layers, with a dielectric layer in between each electrode layer; the diameter of the central area of each continuously-conductive layer would increase with each subsequent layer. For example, whereas the illustrated four-area-target includes three continuously-conductive electrode layers, three selectively-conductive electrode layers, and five dielectric layers (totaling 11 layers), a three-area target would include two of each of the two types of electrode layers, and three dielectric layers (totaling 7 layers); and a five-area target would include four each of the two types of electrode layers and seven dielectric layers (totaling 15 layers).

Many other variations, modifications and applications of the invention will be apparent.

What is claimed is:

1. An electrical device capable of indicating the magnitude and location of an applied force comprising at least three layers including:
   a continously-conductive electrode layer of electrically-conductive material;
   a selectively-conductive electrode layer having a central area of electrically-conductive material and at least one circumscribing area of electrically-conductive material circumscribing said central area and separated therefrom by a gap;

a pressure-sensitive impedance layer between each two electrode layers and forming a first electrical impedance between said continuously-conductive electrode layer and said central area of the selectively-conductive electrode layer, and a second electrical impedance between said continuously-conductive electrode layer and said circumscribing area of said selectively-conductive layer;

said pressure-sensitive impedance layer being compressively-deformable upon application of said force such as to change the values of said first and second electrical impedances, and means for measuring the values of said first and second electrical impedances, thereby providing an indication of the magnitude and location of said force.

2. The device according to claim 1, wherein said pressure-sensitive impedance layer is a dielectric layer which forms first and second capacitors between said continuously-conductive electrode layer and said selectively-conductive electrode layer, the capacitances of said capacitors being changed by said application of the force.

3. The device according to claim 1, comprising at least seven layers, including:
two of said continuously-conductive electrode layers;
two of said selectively-conductive electrode layers, each alternating with said continuously-conductive layers; and
three of said pressure-sensitive impedance layers, each alternating with said electrode layers;
the central area of electrically-conductive material of the second of said selectively-conductive electrode layers being of larger diameter than that of said first selectively-conductive electrode layer;
said two continuously-conductive electrode layers being electrically connected together;
and the two selectively-conductive electrode layers being electrically connected together.

4. The device according to claim 3, comprising at least eleven layers, including:
three of said continuously-conductive electrode layers all electrically connected together;
three of said selectively-conductive electrode layers each alternating with said continuously-conductive electrode layers;
and five of said pressure-sensitive impedance layers, each alternating with said electrode layers;
the central area of electrically-conductive material of the third of said selectively-conductive electrode layers being of larger diameter than that of said second selectively-conductive electrode layer;
said three continuously-conductive electrode layers being electrically connected together;
and the circumscribing areas of the three electrically-conductive electrode layers being electrically connected together.

5. The device according to claim 3, further including:
a first electrical terminal electrically connected to all said continuously-conductive electrode layers;
a second electrical terminal electrically connected to the central area of all said selectively-conductive electrode layers; and a third electrical terminal electrically connected to the circumscribing area of all of said selectively-conductive electrode layers.

6. A display system, including an electrical device according to claim 5, and further including:
a first electrical measuring means for measuring the change in electrical impedance between said first and second electrical terminals;
second electrical means for measuring the change in electrical impedance between said first and third electrical terminals;
first display means for displaying the sum of the measurements of said first and second electrical measuring means, to provide an indication of the magnitude of said applied force; and
second display means for displaying the change in electrical impedance measured by said first electrical measuring means divided by the sum of the change in electrical impedances measured by said first and second electrical measuring means, to thereby provide an indication of the location of said force.

7. The display system according to claim 6, wherein said first and second electrical measuring means measures the changes in capacitances between the respective terminals.

8. An electrical device capable of indicating the magnitude and location of an applied force comprising at least seven layers including:
at least two continuously-conductive electrode layers each of electrically-conductive material;
at least two selectively-conductive electrode layers each alternating with one of said continuously conductive electrode layers, and each having a central area of electrically-conductive material and at least one circumscribing area of electrically-conductive material circumscribing said central area and separated therefrom by a gap, the central area of electrically-conductive material of one of said selectively-conductive electrode layers being of larger diameter than that of the other selectively-conductive electrode layer;
and at least three pressure-sensitive impedance layers each forming a first electrical impedance between one of said continuously-conductive electrode layers and said central area of one of said selectively-conductive eleotrode layers, and a second electrical impedance between one of said continuously-conductive electrode layers and said circumscribing area of one of said selectively-conductive layers;
said pressure-sensitive impedance layer being compressively-deformable upon application of said force such as to change the values of said first and second electrical impedances, thereby providing an indication of the magnitude and location of said force.

9. The device according to claim 8, wherein said pressure-sensitive impedance layers are dielectric layers which form first and second capacitors between said continuously-conductive electrode layers and said selectively-conductive electrode layers, the capacitances of said capacitors being changed by said application of the force.

10. The device according to claim 8, comprising at least eleven layers, including:
three of said continuously-conductive electrode layers all electrically connected together;

three of said selectively-conductive electrode layers each alternating with s continuously-conductive electrode layers;

and five of said pressure-sensitive impedance layers, each alternating with said electrode layers;

the central area of electrically-conductive material of the third of said selectively-conductive electrode layers being of larger diameter than that of said second selectively-conductive electrode layer;

said three continuously-conductive electrode layers being electrically connected together;

and the circumscribing areas of the three electrically-conductive electrode layers being electrically connected together.

11. The device according to claim 8, further including:

a first electrical terminal electrically connected to all said continuously-conductive electrode layers;

a second electrical terminal electrically connected to the central area of all said selectively-conductive electrode layers; and a third electrical terminal electrically connected to the circumscribing area of all of said selectively-conductive electrode layers.

12. A display system, including an electrical device according to claim 8, and further including:

a first electrical measuring means for measuring the change in electrical impedance between said first and second electrical terminals;

second electrical means for measuring the change in electrical impedance between said first and third electrical terminals;

first display means for displaying the sum of the measurements of said first and second electrical measuring means, to provide an indication of the magnitude of said applied force; and second display means for displaying the change in electrical impedance measured by said first electrical measuring means divided by the sum of the change in electrical impedances measured by said first and second electrical measuring means, to thereby provide an indication of the location of said force.

13. The display system according to claim 12, wherein said first and second electrical measuring means measures the changes in capacitances between the respective terminals.

14. An electrical device capable of indicating the magnitude and location of an applied force comprising at least three layers including:

a continuously-conductive electrode layer of electrically-conductive material;

a selectively-conductive electrode layer having a central area of electrically-conductive material and at least one circumscribing area of electrically-conductive material circumscribing said central area and separated therefrom by a gap;

a pressure-sensitive dielectric layer between each two electrode layers and forming a first electrical capacitor between said continuously-conductive electrode layer and said central area of the selectively-conductive electrode layer, and a second electrical capacitor between said continuously-conductive electrode layer and said circumscribing area of said selectively-conductive layer;

said pressure-sensitive dielectric layer being compressively-deformable upon application of said force such as to change the values of said first and second electrical capacitances, and means for measuring the values of said first and second electrical capacitors, thereby providing an indication of the magnitude and location of said force.

15. The device according to claim 14, comprising at least seven layers, including:

two of said continuously-conductive electrode layers;

two of said selectively-conductive electrode layers, each alternating with said continuously-conductive layers; and three of said pressure-sensitive dielectric layers, each alternating with said electrode layers;

the central area of electrically-conductive material of the second of said selectively-conductive electrode layers being of larger diameter than that of said first selectively-conductive electrode layer, said two continuously-conductive electrode layers being electrically connected together;

and the two selectively-conductive electrode layers being electrically connected together.

16. The device according to claim 14, comprising at least eleven layers, including:

three of said continuously-conductive electrode layers all electrically connected together;

three of said selectively-conductive electrode layers each alternating with said continuously-conductive electrode layers;

and five of said pressure-sensitive dielectric layers, each alternating with said electrode layers;

the central area of electrically-conductive material of the third of said selectively-conductive electrode layers being of larger diameter than that of said second selectively-conductive electrode layer;

said three continuously-conductive electrode layers being electrically connected together;

and the circumscribing areas of the three electrically-conductive electrode layers being electrically connected together.

17. The device according to claim 14, further including:

a first electrical terminal electrically connected to said continuously-conductive electrode layer;

a second electrical terminal electrically connected to the central area of said selectively-conductive electrode layer; and a third electrical terminal electrically connected to the circumscribing area of said selectively-conductive electrode layer.

18. A display system, including an electrical device according to claim 17, and further including:

a first electrical measuring means for measuring the change in electrical capacitance between said first and second electrical terminals;

second electrical means for measuring the change in electrical capacitance between said first and third electrical terminals;

first display means for displaying the sum of the measurements of said first and second electrical measuring means, to provide an indication of the magnitude of said applied force; and second display means for displaying the change in electrical capacitance measured by said first electrical measuring means divided by the sum of the change in electrical capacitance measured by said first and second electrical measuring means, to thereby provide an indication of the location of said force.

* * * * *